United States Patent
Schalaster

(10) Patent No.: US 11,806,798 B2
(45) Date of Patent: Nov. 7, 2023

(54) METHOD FOR MACHINING BEVEL GEARS USING AN ECCENTRICALLY-MOVED DRESSABLE CUP GRINDING WHEEL

(71) Applicant: Klingelnberg AG, Zürich (CH)

(72) Inventor: Rolf Schalaster, Wermelskirchen (DE)

(73) Assignee: KLINGELNBERG AG, Zürich (CH)

( * ) Notice: Subject to any disclaimer, the term of this patent is extended or adjusted under 35 U.S.C. 154(b) by 1148 days.

(21) Appl. No.: 16/477,985

(22) PCT Filed: Jan. 8, 2018

(86) PCT No.: PCT/EP2018/050359
§ 371 (c)(1),
(2) Date: Jul. 15, 2019

(87) PCT Pub. No.: WO2018/130495
PCT Pub. Date: Jul. 19, 2018

(65) Prior Publication Data
US 2019/0344368 A1 Nov. 14, 2019

(30) Foreign Application Priority Data
Jan. 16, 2017 (EP) .................................... 17151630

(51) Int. Cl.
*B24B 53/07* (2006.01)
*B24B 53/075* (2006.01)
(Continued)

(52) U.S. Cl.
CPC ............ *B23F 5/10* (2013.01); *B23F 23/1225* (2013.01); *B24B 49/18* (2013.01); *B24B 53/06* (2013.01);
(Continued)

(58) Field of Classification Search
CPC ...... B23F 5/02; B23F 5/04; B23F 5/10; B23F 9/02; B23F 23/1225; B24B 53/06;
(Continued)

(56) References Cited

U.S. PATENT DOCUMENTS 3,127,709 A * 4/1964 Waguri ................. B23F 19/005
451/213
9,180,536 B2 * 11/2015 Dürr ..................... B23F 23/006
(Continued)

FOREIGN PATENT DOCUMENTS

| CN | 1034882 A | 8/1989 |
| CN | 2182029 Y | 11/1994 |

(Continued)

OTHER PUBLICATIONS

International Search Report for Application No. PCT/EP2018/050359, dated Apr. 16, 2018, 4 pages.
(Continued)

*Primary Examiner* — Eileen P Morgan
(74) *Attorney, Agent, or Firm* — McCarter & English, LLP

(57) ABSTRACT

A method which is executed in a grinding machine comprising
a) rotationally driving a cup grinding wheel around an axis of rotation of a tool spindle at a first speed,
b) rotationally driving a dressing tool around an axis of rotation of a dressing spindle at a second speed,
c) carrying out a dressing method using the dressing tool, wherein a predetermined, fixed speed ratio is specified between the first speed and the second speed,
and after steps (a), (b), and (c):
i. eccentrically rotationally driving the cup grinding wheel around the axis of rotation of the tool spindle at a first machining speed using the eccentric drive,
(Continued)

ii. carrying out a grinding method, wherein the bevel gear workpiece is machined by grinding using the cup grinding wheel.

17 Claims, 4 Drawing Sheets

(51) Int. Cl.
 B24B 53/085 (2006.01)
 B24B 49/18 (2006.01)
 B23F 5/10 (2006.01)
 B23F 23/12 (2006.01)
 B24B 53/06 (2006.01)
(52) U.S. Cl.
 CPC ............ B24B 53/07 (2013.01); B24B 53/075 (2013.01); B24B 53/085 (2013.01)
(58) Field of Classification Search
 CPC ..... B24B 53/07; B24B 53/075; B24B 53/085; B24B 49/00; B24B 49/18
 USPC ........ 451/10, 11, 47, 56, 147, 219, 253, 443
 See application file for complete search history.

(56) References Cited

U.S. PATENT DOCUMENTS

2005/0245176 A1* 11/2005 Thyssen ................ B24B 53/075
 451/56

2013/0280990 A1* 10/2013 Geiser ................... B23F 19/052
 451/72

FOREIGN PATENT DOCUMENTS

| CN | 1689760 A | 11/2005 |
| CN | 101513684 A | 8/2009 |
| CN | 103358208 A | 10/2013 |
| CN | 103635280 A | 3/2014 |
| CN | 104029126 A | 9/2014 |
| DE | 2445483 A1 | 4/1976 |
| DE | 2721164 A1 | 11/1978 |
| DE | 102012006581 A1 | 10/2013 |
| DE | 102014111317 A1 | 2/2016 |
| EP | 2093007 A2 | 8/2009 |
| EP | 2647459 A1 | 10/2013 |
| EP | 2774721 B1 | 9/2014 |
| WO | 2010025942 A2 | 3/2010 |

OTHER PUBLICATIONS

International Written Opinion for Application No. PCT/EP2018/050359, dated Apr. 16, 2018, 8 pages.
European Search Report and Search Opinion for European Patent Application No. EP 17151630.5, dated Jun. 23, 2017, 8 pages.
Office Action with Search Report issued in Application No. CN201880007038.8, dated Nov. 24, 2020, 4 pages.

* cited by examiner

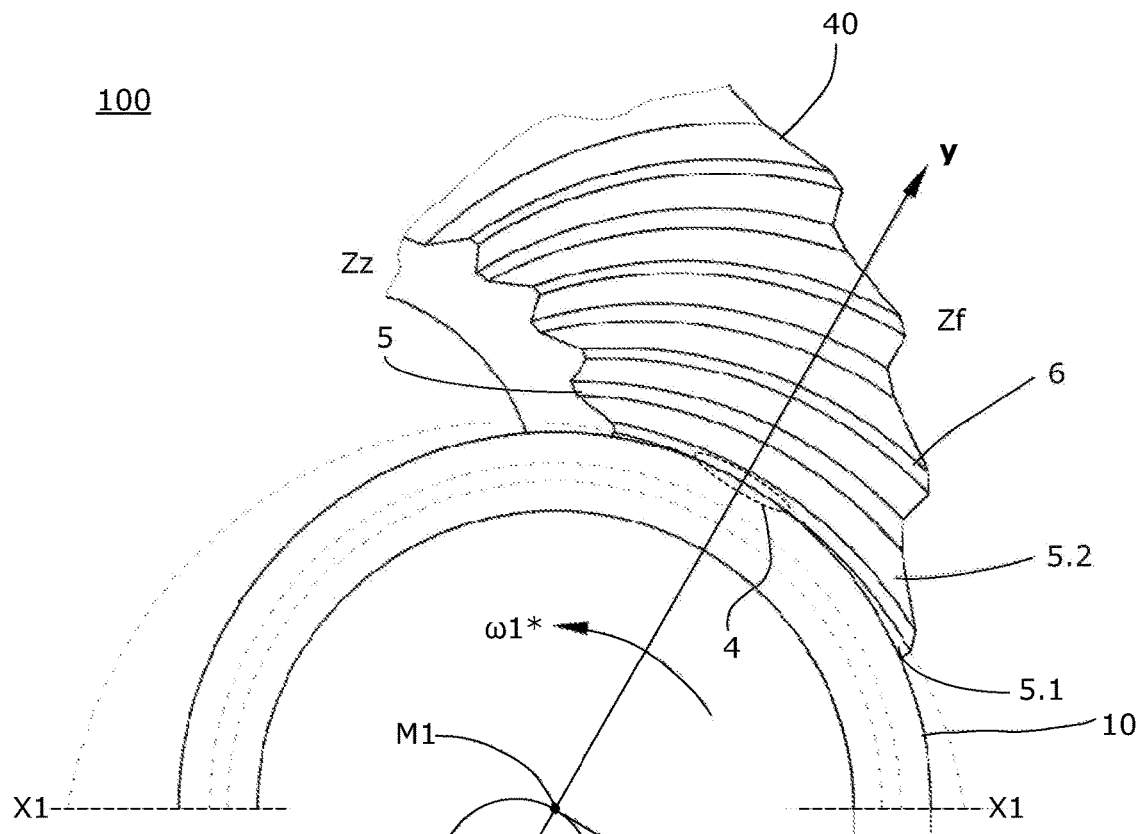
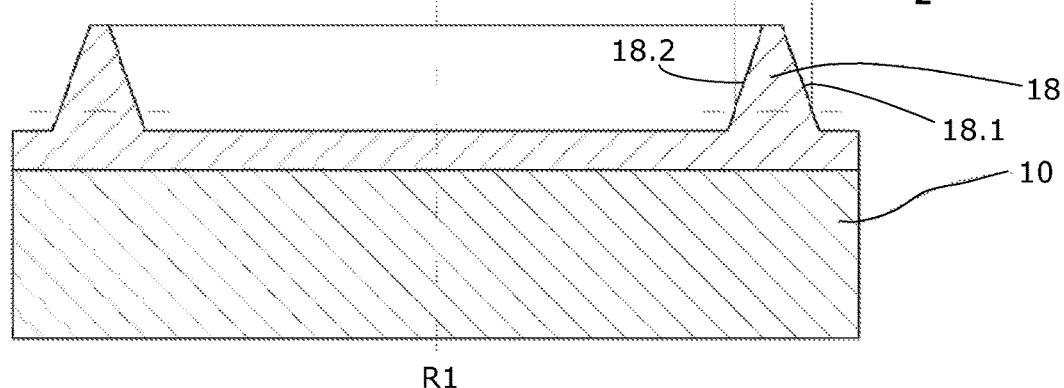
Fig. 3A
Prior Art
Fig. 3B
Prior Art

METHOD FOR MACHINING BEVEL GEARS USING AN ECCENTRICALLY-MOVED DRESSABLE CUP GRINDING WHEEL

CROSS-REFERENCE TO RELATED APPLICATIONS

This application is a national stage application of international application no. PCT/EP2018/050359 filed Jan. 8, 2018, entitled "Method for Machining Bevel Gears Using an Eccentrically Moved Cup Grinding Wheel Which Can Be Dressed," claiming priority to European application no. EP 17 151 630.5, filed Jan. 16, 2017, which are hereby expressly incorporated by reference as part of the present disclosure.

FIELD OF THE INVENTION

The present disclosure generally relates to a method for machining bevel gears using a dressable cup grinding wheel which is eccentrically moved.

BACKGROUND

It is known that bevel gears can be machined using a grinding tool. Cup grinding wheels are frequently used for this purpose.

Dressable cup grinding wheels are usually used. Such cup grinding wheels are dressed from time to time to lengthen the service life thereof and to be able to compensate for appearances of wear, for example.

FIG. 1 schematically indicates how such a cup-shaped grinding wheel 10 can be dressed in a grinding machine 100 using a rotationally driven dressing wheel 30. At the moment shown, the dressing wheel 30 dresses the grinding wheel 10 on the outer circumference. For this purpose, the dressing wheel 30 is seated outside and above the grinding wheel 10. To be able to dress the cup grinding wheel 10 in its interior, the dressing wheel 30 is moved in a CNC-controlled manner into another position located in the interior of the cup grinding wheel 10 and a rotational direction reversal is performed. In FIG. 1, the dressing wheel 30 is shown in a dashed-line illustration in a position for dressing the inner side of the profile 28 of the cup grinding wheel 10. The CNC-controller (path controller) of the machine 100 transmits the required profile to the grinding wheel 10 by the dressing wheel 30 being guided in a CNC-controlled manner along the profile 18 of the grinding wheel 10. Further details on this dressing procedure described by way of example can be inferred, for example, from the specification of European patent no. EP2774721B1.

High-accuracy workpiece machining can only be carried out using a cup grinding wheel 10, the dimensional and shape accuracy of which is within narrow tolerances. It always has to be ensured that the state of the cup grinding wheel 10 is process capable.

A correspondingly dressed cup grinding wheel 10 can be used, for example, for the discontinuous generating grinding of bevel gear workpiece is 40, as shown in FIG. 3A. Such a cup grinding wheel 10 can also be used, however, for the discontinuous profile grinding (also called plunge grinding) of bevel gear workpieces 40, as shown in FIG. 2.

Only crown wheels can be machined using plunge grinding. In contrast, bevel gear pinions and crown wheels can be machined using generating grinding.

Discontinuous plunge grinding and generating grinding are grinding processes according to the single indexing method.

During the plunging of the grinding wheel 10, in the case of plunge grinding, the profile of the cup grinding wheel 10 is depicted in the material of the crown wheel 40 to be manufactured. In the illustration shown in FIG. 2, the cup grinding wheel 10 is presently machining a single tooth gap 5 of the bevel gear workpiece 40.

It is known that the plunging movement of the cup grinding wheel 10 can be overlaid in plunge grinding and in generating grinding with an eccentric auxiliary movement of the grinding wheel center point M1 (M1 defines the passage point of a corresponding axis of rotation through the plane of the drawing), to thus avoid overheating due to grinding and prevent the clogging of the surface of the grinding wheel 10 with metal particles. Details on the eccentric movement of the cup grinding wheel 10 can be inferred, for example, from schematic FIG. 3A.

Due to the mentioned overlay, the cup grinding wheel center point M1 moves on a circular path around a center point M2 (M2 defines the passage point of a corresponding axis of rotation through the plane of the drawing). The radius of the circular path is referred to as the eccentric stroke e and is small in comparison to the radius of the cup grinding wheel 10. Because of this movement, the cup grinding wheel 10 contacts the workpiece 40, geometrically considered, not only along a line which is perpendicular to the plane of the drawing of FIG. 3A. In reality, however, because of the relative advance movement, it is a locally bounded region 4 along the mentioned line, in which the contact takes place. The ratio of the eccentric speed to the speed of the cup grinding wheel 10 is the so-called eccentric ratio EV.

The eccentric auxiliary movement can be produced in grinding machines 100 by the setting of an eccentric ratio EV or the eccentric speed, respectively, in the form of a fixed specification.

FIG. 3A shows the Waguri approach by way of example, in which a cup grinding wheel 10 rotates around the wheel center point M1, which is offset in relation to the center point M2 of a Waguri wheel 3 by a small distance e (called Waguri eccentricity). The eccentric ratio EV is defined as the speed of the eccentric divided by the speed $n1^*$ of the cup grinding wheel 10. The cup grinding wheel 10 rotates during the machining of the workpiece 40 at the angular velocity $\omega1^*$ around the center point M1. The eccentric movement causes a circular movement around M2 for the center point M1 of the cup grinding wheel 10. The circular movement has movement components in the x direction and in the y direction.

FIG. 3B shows a section along line X1-X1 through the cup grinding wheel 10. In FIG. 3B, the profile 18 of the cup grinding wheel 10 can be seen. The peripheral outer face on the profile 18 is identified by the reference sign 18.1 and the peripheral inner face is identified by the reference sign 18.2.

Due to the overlaid eccentric movement, an (excessively) large surface contact between the outer circumference 18.1 of the profile 18 of the cup grinding wheel 10 and the entire surface of the concave flank 5.1 of the workpiece 40 or between the inner circumference 18.2 of the profile 18 of the cup grinding wheel 10 and the entire surface of the convex flank 5.2, respectively, is avoided.

With otherwise constant ratios, the frequency of the contact of the cup grinding wheel 10 with the tooth flank 5.1 or 5.2, the location of this contact region on the cup grinding wheel 10, and the phasing of the contact of concave and convex tooth flank 5.2, 5.1 are dependent on the selected eccentric ratio EV.

If the eccentric ratio EV=1, the eccentric wheel 3 thus rotates once during one full revolution of the cup grinding wheel 10. The cup grinding wheel 10 thus contacts the concave flank 5.1 of the tooth gap 5 once (at 0°) and the convex flank 5.2 of the tooth flank 5 once (at) 180° during each full revolution. The contact always takes place in the same region. If the eccentric ratio EV=2, two contacts of the cup grinding wheel 10 thus take place with the concave flank 5.1 of the tooth gap 5 (at 0° and 180°) or with the convex flank 5.2 of the tooth gap 5 (at 90° and 270°), respectively, during one full revolution of the cup grinding wheel 10. These degree specifications each relate to a fixed x-y coordinate system of the cup grinding wheel 10 and in the mentioned special cases, no displacement of the contact regions takes place along the grinding wheel circumference from full revolution of the cup grinding wheel 10 to full revolution.

The eccentric ratio EV, which is predetermined, can also be a rational number lQ. A practical example is an eccentric ratio of EV=0.7. If the cup grinding wheel 10 executes multiple full revolutions, the contact regions are displaced farther and farther and finally the entire grinding wheel circumference on the profile 18 is used for the grinding machining.

An undesirably large surface contact between the cup grinding wheel 10 and the workpiece 40 may be avoided by the eccentric movement. Details on the overlay of a cyclic eccentric movement can be inferred, for example, from German published applications DE 2721164 A and DE 2445483 A.

Practical experiments have shown that rolled bevel gears, which were ground using the eccentric movement, can have a surface having optically visible shading. In addition, these components can display noticeable noise behavior in operation, which is to be attributed to waviness of the tooth flanks.

SUMMARY

It is therefore an objective to provide an approach which enables this unusual noise behavior to be avoided.

The method according to at least some embodiments is executed in a grinding machine, which comprises:
- a tool spindle for accommodating a cup grinding wheel provided with an abrasive surface and for rotationally driving the cup grinding wheel around an axis of rotation,
- a dressing spindle for accommodating a dressing tool, which is designed for dressing the cup grinding wheel, and for rotationally driving the dressing tool around an axis of rotation,
- a workpiece spindle for accommodating a bevel gear workpiece and for rotationally driving the bevel gear workpiece around an axis of rotation, wherein the workpiece spindle is provided with an eccentric drive, the eccentric ratio of which is specifiable.

The method according to at least some embodiments comprises the following dressing steps:
- a) rotationally driving the cup grinding wheel around the axis of rotation of the tool spindle at a first speed,
- b) rotationally driving the dressing wheel around the axis of rotation of the dressing spindle at a second speed,
- c) carrying out a dressing method, in which the cup grinding wheel is dressed using the dressing tool, wherein a predetermined, fixed speed ratio is specified between the first speed and the second speed during this step, and having the following machining steps, which are executed after the dressing steps are carried out:
- i. eccentric rotational driving of the cup grinding wheel around the axis of rotation of the tool spindle at a first machining speed using the eccentric drive,
- ii. carrying out a grinding method, in which the bevel gear workpiece is machined by grinding using the cup grinding wheel.

The inventors realized that an integrated approach optimizes the interaction of the dresser during the dressing procedure with the cup grinding wheel and the interaction of the correspondingly dressed cup grinding wheel with the bevel gear workpiece. The development of this approach first became possible after other faults and inaccuracies of previous dressing procedures and grinding procedures were systematically excluded.

It has been shown in accurate studies that the conditions of the dressing procedure of the prior art can have negative influences on the grinding machining of the workpieces, which have previously not been recognized.

According to at least some embodiments, the corresponding speed ratios are therefore specially adapted to one another.

For this purpose, for example, in at least some embodiments, a fixed speed ratio is specified for the dressing, which is either defined as the ratio of the first speed to the second speed or as the ratio of the second speed to the first speed.

The value of the fixed speed ratio during the dressing may correspond to a natural number $\mathbb{N}$. The value of the fixed speed ratio may correspond to a natural number $\mathbb{N}$ of the set $\{1, 2, 3, 4 \ldots 10\}$.

However, in some embodiments the fixed speed ratio during dressing is defined as the fraction of two natural numbers $\mathbb{N}$. The value of the fixed speed ratio may correspond to a fraction of the set $\{½, ⅓, ⅔, ¼, ¾\}$.

In at least some embodiments, an eccentric ratio is determined (such as from an array of multiple suitable eccentric ratios) for a fixed speed ratio and used during the eccentric grinding of the bevel gear workpiece. The use of such an eccentric ratio is optional, however, but can be used to provide still better results in the matter of noise behavior.

At least some embodiments may be used for the fine machining or finish machining of bevel gear workpieces.

This summary is not exhaustive of the scope of the present aspects and embodiments. Thus, while certain aspects and embodiments have been presented and/or outlined in this summary, it should be understood that the present aspects and embodiments are not limited to the aspects and embodiments in this summary. Indeed, other aspects and embodiments, which may be similar to and/or different from, the aspects and embodiments presented in this summary, will be apparent from the description, illustrations, and/or claims, which follow.

It should also be understood that any aspects and embodiments that are described in this summary and do not appear in the claims that follow are preserved for later presentation in this application or in one or more continuation patent applications.

BRIEF DESCRIPTION OF THE DRAWINGS

Exemplary embodiments, which are understood not to be limiting, are described in greater detail hereafter with reference to the drawings.

FIG. 3A is a schematic view, which is not to scale, of a known cup grinding wheel which is eccentrically mounted in a known manner on a Waguri wheel and machines a tooth gap of a crown wheel workpiece at the moment shown;

FIG. 3B is a schematic sectional view of the cup grinding wheel according to FIG. 3A along line X1-X1;

DETAILED DESCRIPTION

Terms are used in conjunction with the present description which are also used in relevant publications and patents. However, it is to be noted that the use of these terms is merely to serve for better comprehension. The inventive concepts and the scope of protection of the claims for protection are not to be restricted in the interpretation by the specific selection of the terms. The invention may be readily transferred to other term systems and/or technical fields. The terms are to be applied accordingly in other technical fields.

At least some embodiments are based on an integrated approach, which optimizes the interaction of the dresser 30 during the dressing procedure with the cup grinding wheel 10 and the interaction of the correspondingly dressed cup grinding wheel 10 with the bevel gear workpiece 40, to thus indirectly influence the noise behavior of the bevel gear workpiece 40.

The solution first became possible by way of accurate analysis of the complex relationships and the mutual dependencies. The results of these analyses are explained hereafter on the basis of very simplified examples and figures before details of the at least some embodiments of the claimed method are described.

Figure 1:
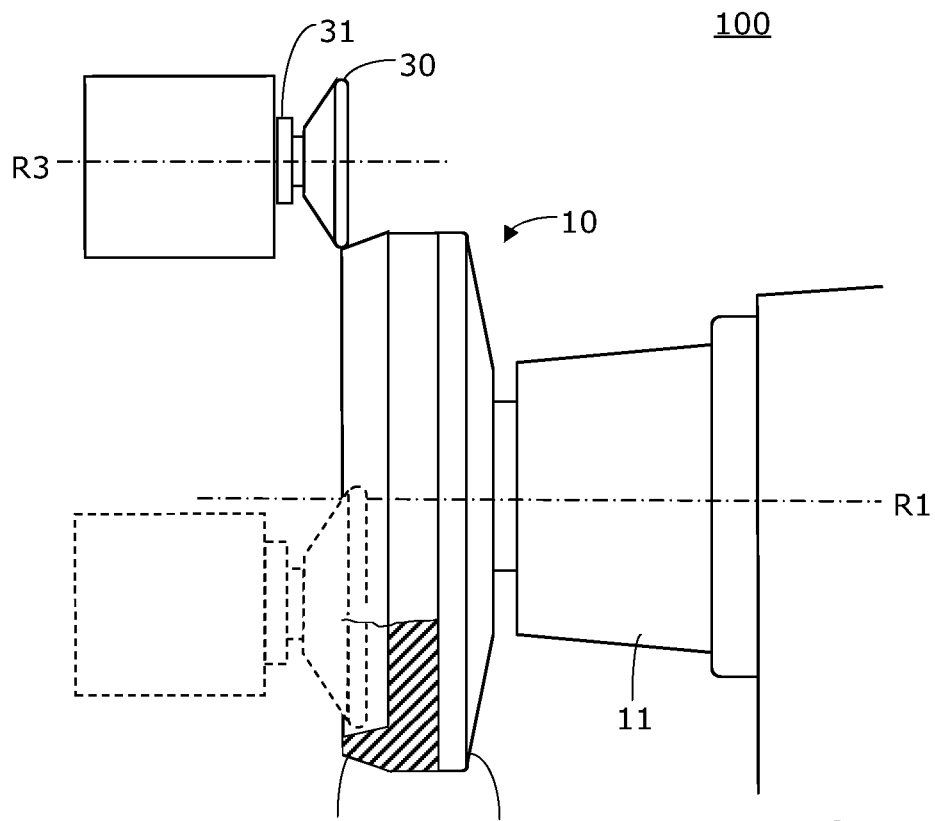
FIG. 1 is a schematic side view of a part of a known grinding machine having a cup grinding wheel which is dressed by means of a dressing wheel on the outer circumference (the dressing of the inner circumference using the dressing wheel is indicated by a dashed-line illustration)
Figure 2:
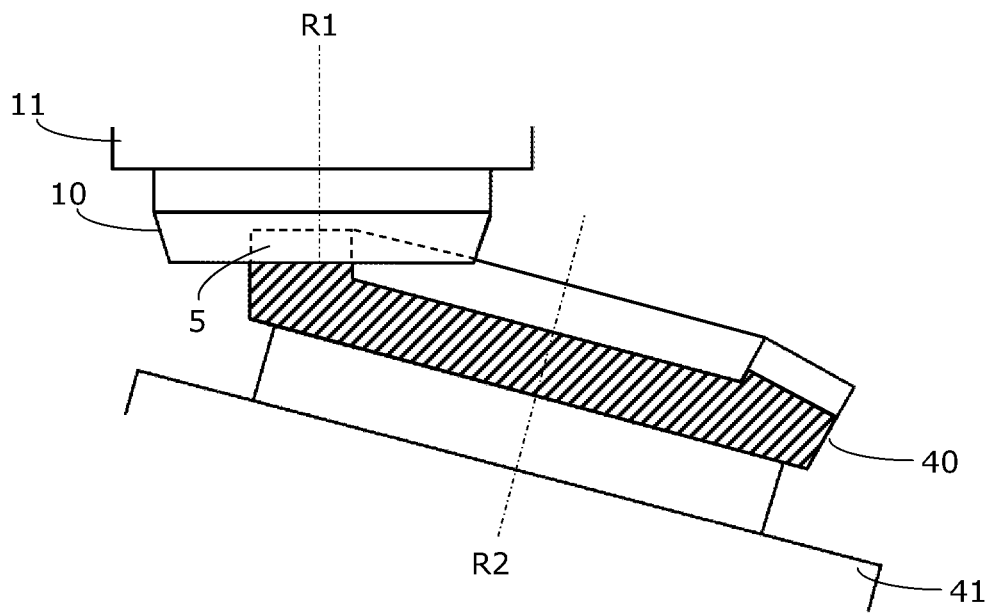
FIG. 2 is a schematic side view of a known cup grinding wheel during the plunge grinding of a bevel gear workpiece, wherein the bevel gear workpiece is shown in axial section.

Reference is made, inter alia, to FIGS. 1, 2, and also 3A and 3B and the description thereof.

Figure 4A:
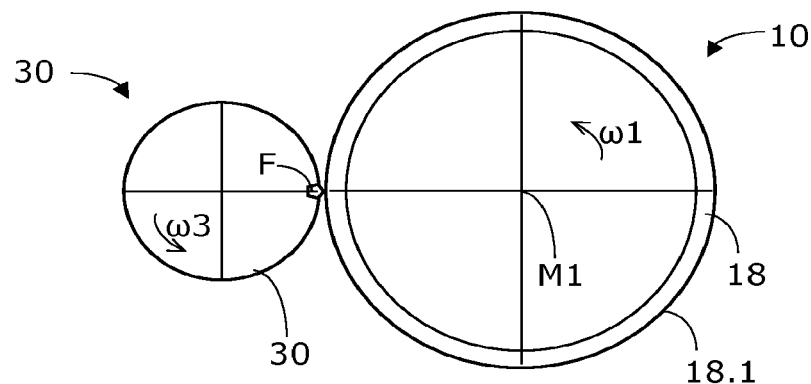
FIG. 4A is a schematic sectional view of a cup grinding wheel in radial section, which is dressed at the moment shown using a dressing wheel on the outer circumference.

FIG. 4A shows a top view of a cup grinding wheel 10 and a dressing wheel 30 in a first, very schematic snapshot. The profile 18 is shown only as a horizontal section (also called radial section). The dressing wheel 30 is shown as a disk, the diameter of which is 50% of the external diameter of the profile 18 here. The dressing wheel 30 typically has a diameter which is significantly smaller than the external diameter of the cup grinding wheel 10. A flaw F is shown on the outer circumference of the dressing wheel 30 by a small symbol. This can be, for example, a diamond crystal which has a somewhat different orientation than the other crystals. The dressing wheel 30 can also, however, have a concentricity error, which can be displayed, for example, by a slight beat or stroke in the region of the symbol F. The principle described hereafter applies both to dressing wheels 30 having flaws F of the surface and also to dressing wheels 30 having concentricity flaws.

In the case of dressing, a velocity ratio has heretofore always been specified to achieve an optimum dressing result. The velocity ratio is usually defined by the dressing factor. The dressing factor is defined as the ratio of dressing roller peripheral velocity and grinding wheel peripheral velocity.

The rotational velocity $\omega 3$ of the dressing wheel 30 and the rotational velocity $\omega 1^*$ of the cup grinding wheel 10 were controlled accordingly to achieve the desired relative cutting velocity in the region of the present interaction.

In contrast, the speeds n1 of the cup grinding wheel 10 and n3 of the dressing wheel 30 are used hereafter. This is because the speeds are variables which are independent of the radius and/or diameter.

If the two speeds correspond, i.e., if n1=n3, the flaw F or the concentricity flaw of the dressing wheel 30 only contacts the peripheral outer face 18.1 once per full revolution. If no other relative movements are carried out during the dressing, this flaw F or the concentricity error would thus encounter the same point on the outer face 18.1 of the cup grinding wheel 10 again and again.

Figure 4B:
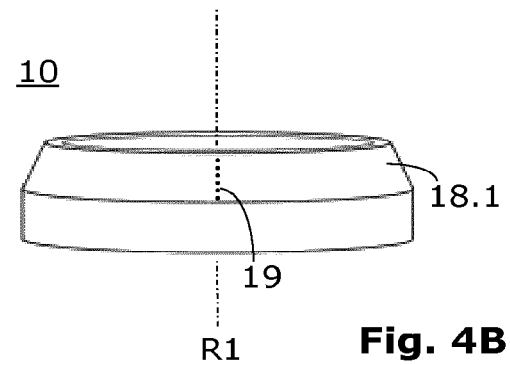
FIG. 4B is a schematic side view of the cup grinding wheel of FIG. 4A after the dressing using the dressing wheel of FIG. 4A at identical speeds.

FIG. 4B shows a side view of the cup grinding wheel 10 after the dressing using a dressing wheel 30 of FIG. 4A. If the dressing wheel 30 is moved parallel to the direction of the axis of rotation R1 (axially-parallel dressing advance) during the dressing in relation to the cup grinding wheel 10 and if the specification n1=n3 still applies, a series of surface imperfections thus results along an axially-parallel line. The centers of these surface imperfections are shown by the points of a dotted line 19 in FIG. 4B.

If one, as was heretofore the case, specifies a suitable dressing factor for the dressing on the basis of a desired relative cutting velocity, a speed ratio DV=n1/n3 thus results in nearly all cases which is not integral, since the dressing factor is determined by the radii and by the respective angular velocities $\omega 1$ and $\omega 3$ of the cup grinding wheel 10 and the dressing wheel 30. In practice, the speed ratio DV is therefore defined by an irrational number.

If one proceeds from a real cup grinding wheel 10, the side view of which is shown, for example, in FIG. 3B, it is then furthermore to be taken into consideration that its external circumference is variable since the profile 18 has a conical shape. I.e., the effective active diameter of the cup grinding wheel 10 and thus also the cutting velocity change with the dressing advance. If one thus, as heretofore typical, wishes to maintain a specific relative cutting velocity, the speed n1 of the cup grinding wheel 10 and/or the speed n3 of the dressing wheel 30 thus have to be changed while the dressing wheel 30 executes, for example, an axially-parallel dressing advance.

Figure 4C:
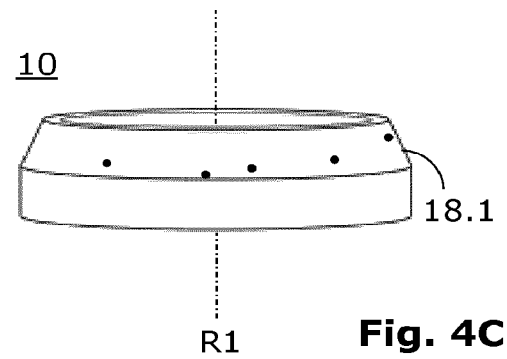
FIG. 4C is a schematic side view of the cup grinding wheel of FIG. 4A after the dressing using the dressing wheel of FIG. 4A at unequal speeds.

If one proceeds from an irrational speed ratio n1/n3, which has heretofore always resulted in practice, and if one applies this to the example of FIGS. 4A, 4B, it is then immediately apparent that a complicated distribution of the surface imperfections on the peripheral outer face 18.1 results. Such a distribution is symbolized in simplified form in FIG. 4C by multiple surface imperfections which are distributed quasi-arbitrarily on the outer face 18.1. The surface imperfections are schematically shown here by multiple black points.

In the following conceptual step, a real dressing wheel 30 is presumed, the surface of which has not only one flaw F but rather a whole number of flaws and/or has a concentricity flaw. These flaws can be distributed, for example, along the circumference of the dressing wheel 30.

If a dressing procedure of the outer face 18.1 using irrational speed ratios n1/n3 were now carried out using a real dressing wheel 30, which has numerous flaws and/or a concentricity flaw, in which the dressing wheel 30 executes an axially-parallel dressing movement parallel to the direction of the axis of rotation R1 in relation to the cup grinding wheel 10, finally a random distribution more or less severe surface imperfections results on the entire outer face 18.1. Similarly, randomly distributed surface imperfections could also occur on the entire inner face 18.2 during the dressing of the inner face 18.2.

In practice, these relationships are even significantly more complex than described here. Therefore, angle flaws, crowning flaws, and waviness can result on the cup grinding wheel 10, which can change, for example, along the circumference of the cup grinding wheel 10.

In the next conceptual step, the eccentric plunge machining of a bevel gear workpiece 40 is performed using a real cup grinding wheel 10, the outer face 18.1 of which has a random distribution of surface imperfections. The eccentric plunge machining is a discontinuous process, in which the bevel gear workpiece 40 does not rotate during the grinding. During the plunge, only a relative depth infeed is performed, while an eccentricity is overlaid on the rotational movement ω1* of the cup grinding wheel 10, as already described. A snapshot of an eccentric plunge machining is shown in FIG. 2.

The method may also be applied to eccentric generating grinding, however. Eccentric generating grinding is also a discontinuous process, in which the bevel gear workpiece 40 is machined tooth gap by tooth gap. The rotational movement ω2* of the bevel gear workpiece 40 is coupled in eccentric generating grinding to the rotational movement ω1* of the cup grinding wheel 10.

In generating grinding, a linear contact takes place, for example, between the tooth flank 5.1 and the cup grinding wheel 10. The rolling movement takes place in generating grinding from the tooth heel Zf (see FIG. 3A) on the outer diameter up to the tooth toe Zz (see FIG. 3A) on the inner diameter of the bevel gear workpiece 40 or vice versa.

In generating grinding, a contact line results along the tooth flank due to the contact of bevel gear workpiece 40 and cup grinding wheel 10, from which paths of the abrasive grains result at the contact point or the contact line, respectively. The location of this contact line continuously changes due to the rolling movement.

Due to the overlay of an eccentric movement, the contact line is reduced to a contact point, which travels along the contact line within an angle range of the eccentric revolution.

If, as described at the outset, an eccentricity factor of, for example, 1 is specified, there is thus one contact of the outer face 18.1 of the cup grinding wheel 10 with the concave flank 5.1 of the tooth gap 5 which is presently being ground per full revolution of the cup grinding wheel 10. Since the cup grinding wheel 10 is moved through the tooth gap 5 during the grinding because of the coupled rolling movement, while the cup grinding wheel 10 executes, for example, five full revolutions, five contacts occur between the outer face 18.1 of the cup grinding wheel 10 and the concave flank 5.1. Because of the mentioned rolling movement of the cup grinding wheel 10 through the tooth gap 5, the contacts travel along the concave flank 5.1, for example, from the tooth heel Zf to the tooth toe Zz.

Although the surface imperfections are randomly distributed on the outer face 18.1, uniformly repeating surface imperfections form on the concave flank 5.1 because of the integral eccentricity factor.

Studies have shown, for example, that these uniformly repeating surface imperfections can have a significant influence on the noise behavior of such bevel gear workpieces 40. In eccentric-plunge-ground bevel gear workpieces 40, for example, flaws occur in the profile direction. In eccentric-generating-ground bevel gear workpieces 40, different wave patterns can occur in dependence on the grinding and eccentric spindle speeds.

The description of at least some embodiments of the method follows hereafter. Substantive matters were crystallized therefrom, which mutually influence one another and which can finally result in undesired surface imperfections on the bevel gear workpiece 40.

A special method was therefore developed to prevent surface imperfections from resulting, which have a form of the periodicity in an undesired manner. Surface perfections per se are inherent to the process, but it is possible to prevent by maintaining specific conditions that these surface imperfections repeat unfavorably, or they are overlaid on the workpiece unfavorably in another manner.

The method is designed to be executed in a grinding machine 100 (also referred to in general here as a device 100). The grinding machine 100 comprises, as shown by way of example in FIG. 5, a tool spindle 11 for accommodating and rotationally driving a cup grinding wheel 10 provided with abrasive surfaces 18.1, 18.2. In addition, it comprises a dressing spindle 31 for accommodating and rotationally driving a dressing tool 30, which is designed for dressing the cup grinding wheel 10. Furthermore, a workpiece spindle 41 is provided for accommodating and rotationally driving a bevel gear workpiece 40, wherein the workpiece spindle 41 is provided with an eccentric drive 3, the eccentric factor of which can be specified. The eccentric drive 3 can be designed, for example, as shown in FIG. 3A.

The method, which is executed in such a grinding machine 100, comprises the following dressing steps in at least some embodiments:

rotationally driving the grinding wheel 10 around an axis of rotation R1 of the tool spindle 11 at a first (dressing) speed n1, rotationally driving the dressing tool 30 around an axis of rotation R3 of the dressing spindle 31 at a second (dressing) speed n3, carrying out a dressing method, in which the grinding wheel 10 is dressed using the dressing tool 30, wherein an exactly predetermined, fixed speed ratio DV is specified between the first (dressing) speed n1 and the second (dressing) speed n3 during this step.

For this purpose, for example, in at least some embodiments a fixed speed ratio DV is specified, which is either defined as the ratio of the first speed n1 to the second speed n3 (i.e., DV=n1/n3) or as the ratio of the second speed to the first speed (i.e., DV=n3/n1).

The value of the fixed speed ratio DV may correspond to a natural number $\mathbb{N}$. The value of the fixed speed ratio DV may correspond to a natural number N of the set {1, 2, 3, 4 . . . 10}.

However, in at least some embodiments the fixed speed ratio DV is defined as a fraction of two natural numbers N. The value of the fixed speed ratio DV may correspond to a fraction of the set {½, ⅓, ⅔, ¼, ¾}.

This first measure and the described dressing steps using exactly predetermined, fixed speed ratio DV have the effect that a distribution of the surface imperfections which is not erratic, but rather relatively uniform, results along the surfaces 18.1, 18.2 of the cup grinding wheel 10. Thus, a concentricity flaw of the dressing wheel 30 is formed exactly as a concentricity flaw of the grinding wheel 10 (kinematic deviations from the dressing rolling radius are neglected in this case) if, for example, one proceeds from a speed ratio DV=1, 2 or, for example, ½.

A cup grinding wheel 10 thus dressed is now used in the scope of the following machining steps for grinding a bevel gear workpiece 40. These machining steps are executed after carrying out the dressing steps.

rotationally driving the cup grinding wheel 10 around the axis of rotation R1 of the tool spindle 11, carrying out an eccentric grinding method, in which the bevel gear workpiece 40 is machined using the cup grinding wheel 10, i.e., an eccentric drive 3 is used during the grinding of the bevel gear workpiece 40.

During the grinding of the bevel gear workpiece 40, an eccentric ratio EV which is unequal to 1 may be specified for the eccentric drive 3 in at least some embodiments.

In the determination of the eccentric ratio EV, as can be performed in at least some embodiments, it is to be noted that this eccentric ratio EV is defined without relative (shift) movements between the cup grinding wheel 10 and the bevel gear workpiece 40. In other words, variations of the eccentric ratio EV remain unconsidered in the determination of an eccentric ratio EV, which result, for example, from relative (shift) movements between the cup grinding wheel 10 and the bevel gear workpiece 40.

Eccentric ratios EV which do not correspond to a natural number N may be suitable in at least some embodiments, i.e., fractional numbers may be suitable as eccentric factors EV. Alternatively, for example, eccentric ratios can also be selected which correspond to an even or odd natural number ≥1 (for example, 1, 2, 3, 4 or 5).

This second optional measure can have the effect that periodically repeating surface imperfections of the tooth flanks 5.1, 5.2 of the bevel gear workpiece 40 do not result. This applies, for example, to the eccentric generating grinding of bevel gear workpieces 40.

Figure 5:
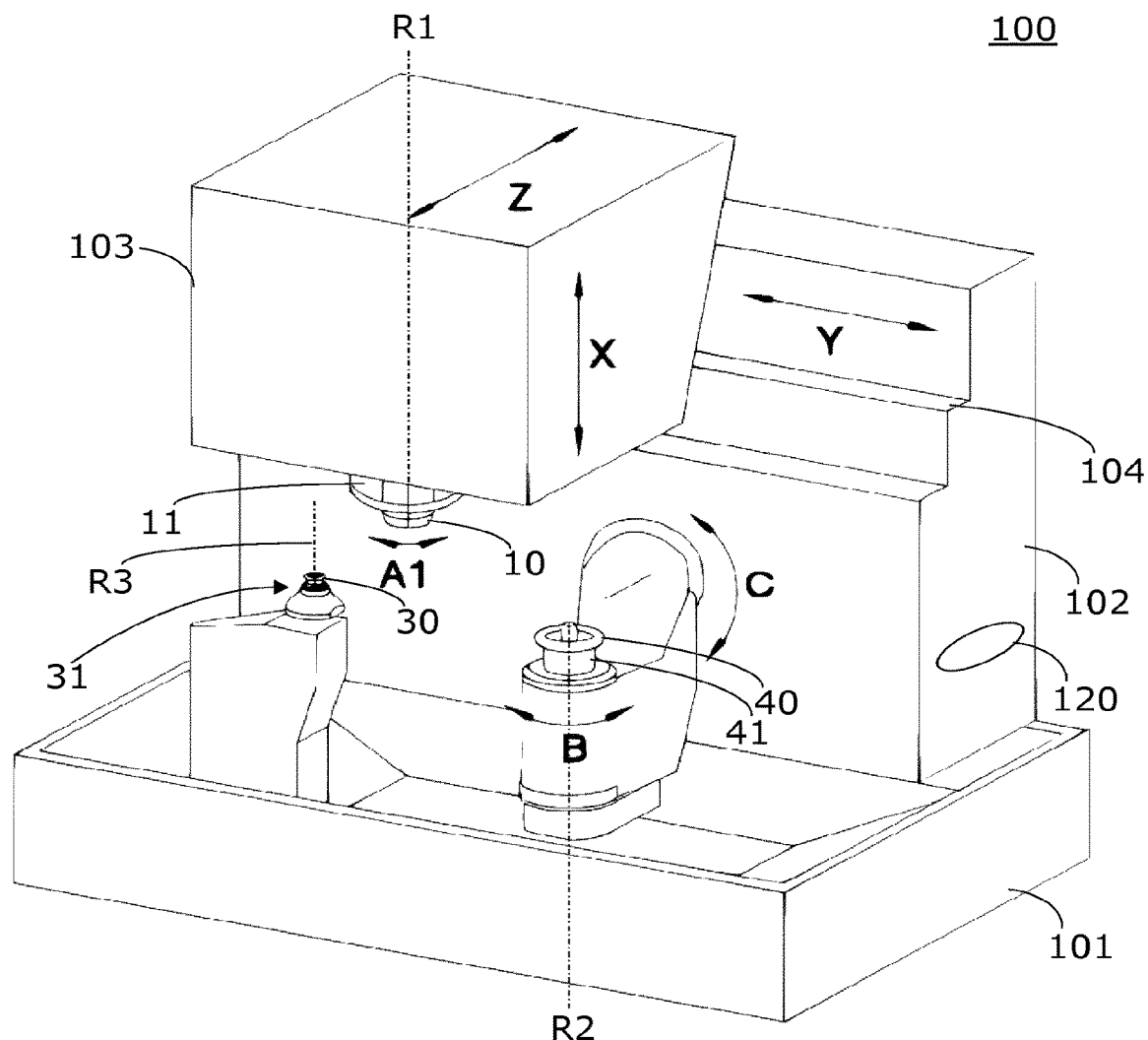
FIG. 5 is a perspective view of an exemplary device in which the method can be executed.

An exemplary device 100 is shown in FIG. 5. The method steps can be implemented in at least some embodiments, for example, in a (machine) controller 120 of the device 100. However, the device 100 can also be externally controlled in at least some embodiments, for example, to execute the steps of the method. In FIG. 5, the (machine) controller 120 is symbolized by an ellipse.

A device 100 having a workpiece spindle 41 for accommodating a bevel gear workpiece 40 and a tool spindle 11 for accommodating the cup grinding wheel 10 may be suitable. The device 100 has multiple drives for machining the bevel gear workpiece 40. The drives are concealed behind panels of the device 100. Furthermore, the device 100 shown by way of example comprises a machine bed 101. A carriage 103, which is displaceable along horizontally extending rails 104 parallel to the Y axis, is provided on a stand 102, which extends parallel to the x-y plane. The carriage 103 carries the tool spindle 11 and can execute translational movements in the X and Z directions.

The device 100 additionally comprises a dressing spindle 31, which carries a dressing wheel 30 here. The rotational drive, which causes the rotation of the cup grinding wheel 10 around the axis of rotation R1, is also referred to as the A1 rotational drive. A B rotational drive rotates the bevel gear workpiece 40 around the axis of rotation R2. During the grinding machining of the bevel gear workpiece 40 using the cup grinding wheel 10, the rotational movements thereof are (electronically) coupled. The corresponding drives of the device 100 are also identified here by the letters X, Y, Z, A1 and B. The device 100 can additionally have a pivot axis C having a corresponding pivot drive, as shown in FIG. 5.

While the above describes certain embodiments, those skilled in the art should understand that the foregoing description is not intended to limit the spirit or scope of the present disclosure. It should also be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

The invention claimed is:

1. A method comprising:
    machining a bevel gear workpiece using a grinding machine including
        a tool spindle configured to receive a cup grinding wheel with an abrasive surface and to rotationally drive the cup grinding wheel around an axis of rotation of the tool spindle, wherein the tool spindle comprises an eccentric drive;
        a dressing spindle configured to receive a dressing tool configured to dress the cup grinding wheel, and to rotationally drive the dressing tool around an axis of rotation of the dressing spindle, and
        a workpiece spindle configured to receive the bevel gear workpiece and to rotationally drive the bevel gear workpiece around an axis of rotation of the bevel gear workpiece;
    wherein the machining step includes
    a) rotationally driving the cup grinding wheel around the axis of rotation of the tool spindle at a first speed,
    b) rotationally driving the dressing tool around the axis of rotation of the dressing spindle at a second speed, and
    c) dressing the cup grinding wheel using the dressing tool at a predetermined, fixed speed ratio between the first speed and the second speed, wherein the fixed speed ratio defines a ratio of (1) the first speed to the second speed or (2) the second speed to the first speed;
    and, after steps (a), (b), and (c):
    i. eccentrically rotationally driving the cup grinding wheel around the axis of rotation of the tool spindle at a first machining speed using the eccentric drive, and
    ii. grinding machining the bevel gear workpiece using the cup grinding wheel.

2. The method according to claim 1, wherein, at least during step (c), the fixed speed ratio defines a ratio of the first speed to the second speed.

3. The method according to claim 1, wherein, at least during step (c), the fixed speed ratio defines a ratio of the second speed to the first speed.

4. The method according to claim 2, wherein the fixed speed ratio has a value defined by a natural number N.

5. The method according to claim 2, wherein the fixed speed ratio has a value defined by a fraction of two natural numbers N.

6. The method according to claim 1, including performing at least step ii at an eccentric ratio of the eccentric drive, wherein the eccentric ratio is defined by a ratio of a speed of the eccentric drive to the first machining speed and has a value defined by a rational number lQ excluding variations of the eccentric ratio due to relative shift movements between the cup grinding wheel and the bevel gear workpiece.

7. The method according to claim 1, wherein step ii further comprises moving the cup grinding wheel only in a relative plunge movement relative to the bevel gear workpiece in addition to the rotationally driving the cup grinding wheel.

8. The method according to claim 1, wherein step ii further comprises executing a coupled rolling movement of the cup grinding wheel relative to the bevel gear workpiece in addition to the rotationally driving the cup grinding wheel.

9. The method according to claim 1, further comprising predetermining the fixed speed ratio.

10. The method according to claim 9, wherein the predetermining step includes an input request on a display screen operatively connected or connectable to the grinding machine.

11. The method according to claim 9, including performing the predetermining step via a controller of the machine.

12. The method according to claim 2, wherein step ii further comprises moving the cup grinding wheel only in a relative plunge movement relative to the bevel gear workpiece in addition to the rotationally driving the cup grinding wheel.

13. The method according to claim 3, wherein step ii further comprises moving the cup grinding wheel only in a relative plunge movement relative to the bevel gear workpiece in addition to the rotationally driving the cup grinding wheel.

14. The method according to claim 2, wherein step ii further comprises executing a coupled rolling movement of the cup grinding wheel relative to the bevel gear workpiece in addition to the rotationally driving the cup grinding wheel.

15. The method according to claim 3, wherein step ii further comprises executing a coupled rolling movement of the cup grinding wheel relative to the bevel gear workpiece in addition to the rotationally driving the cup grinding wheel.

16. The method according to claim 2, further comprising predetermining the fixed speed ratio.

17. The method according to claim 3, further comprising predetermining the fixed speed ratio.

* * * * *